INVENTORS
GRANT N. WILLIS
FRANK A. CLARY, JR.

Oct. 29, 1957

G. N. WILLIS ET AL 2,811,171

DISPENSING VALVE

Filed Aug. 14, 1953

INVENTORS
GRANT N. WILLIS
FRANK A. CLARY, JR.

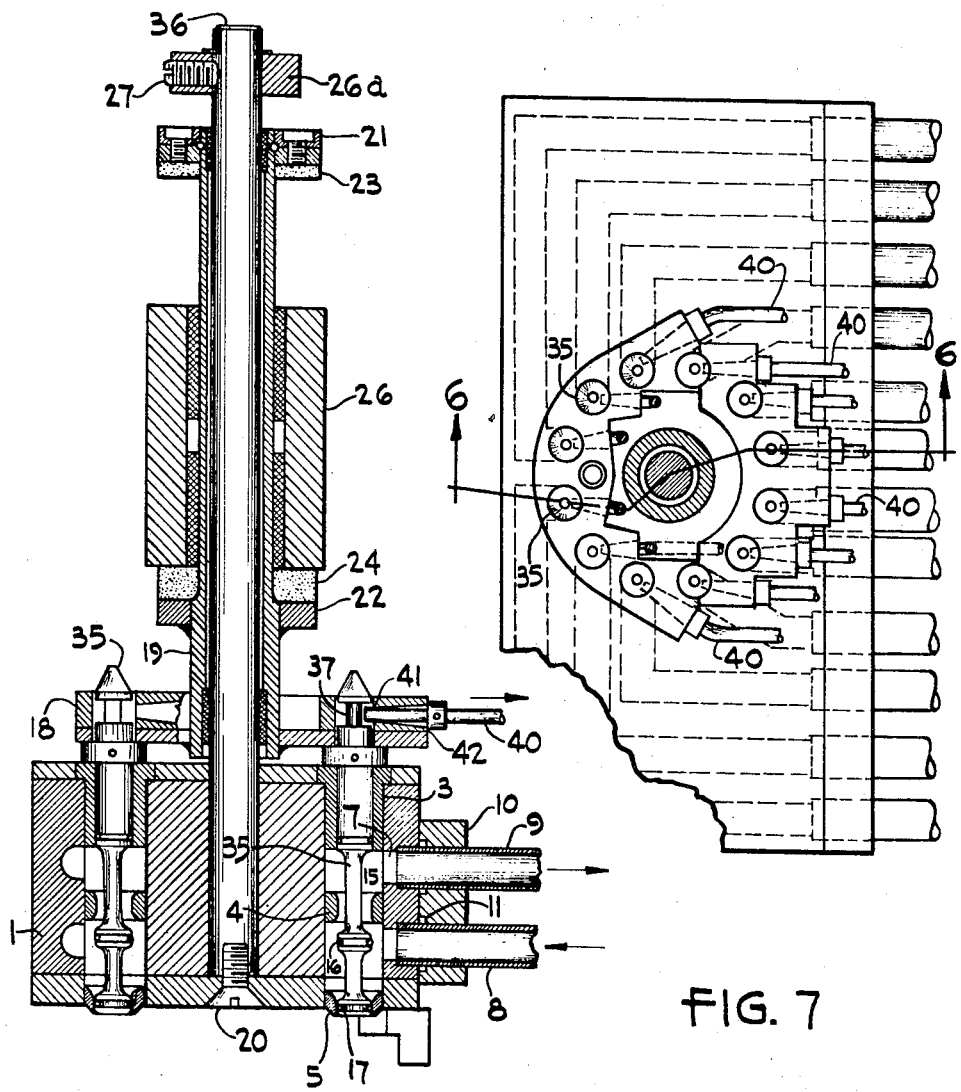

Oct. 29, 1957  G. N. WILLIS ET AL  2,811,171
DISPENSING VALVE
Filed Aug. 14, 1953  6 Sheets-Sheet 5
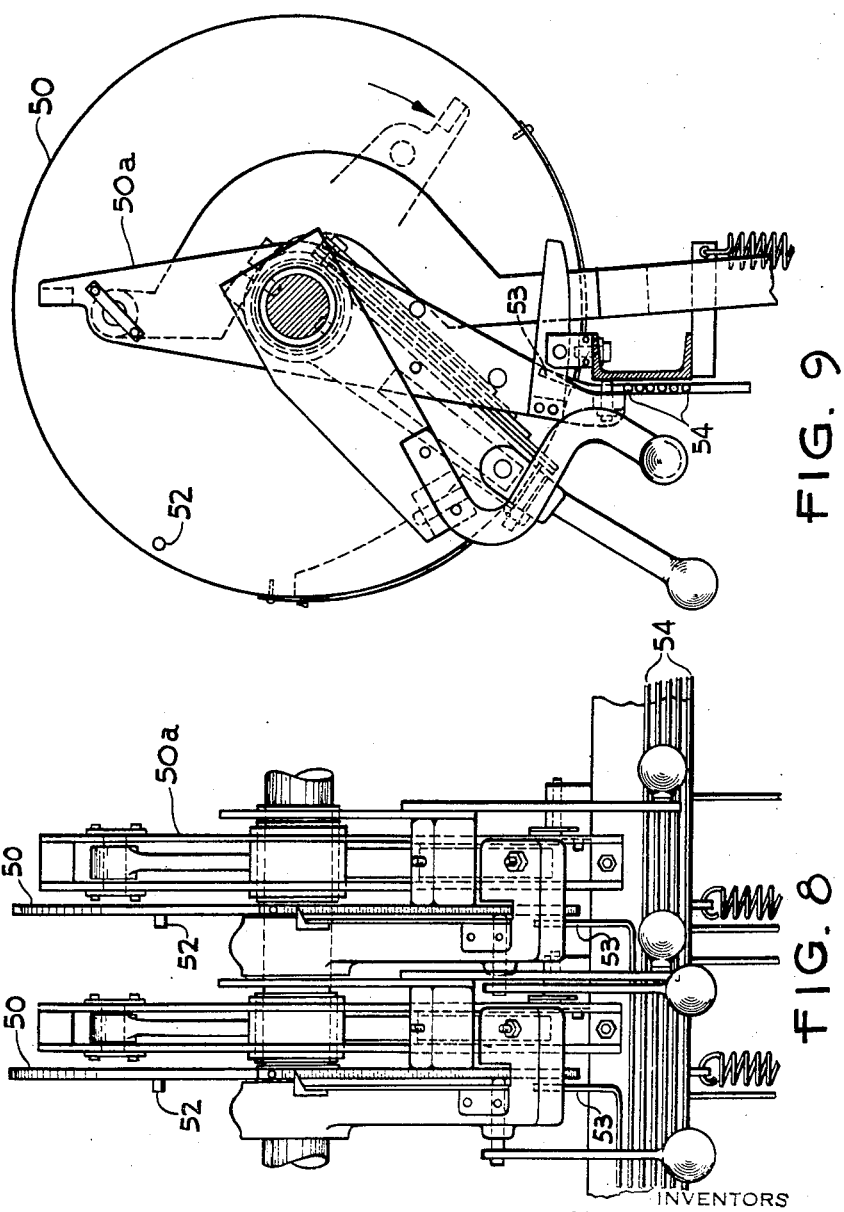

United States Patent Office 2,811,171
Patented Oct. 29, 1957

2,811,171

DISPENSING VALVE

Grant Noble Willis and Frank Alfred Clary, Jr., Bristol, Conn., assignors to The Martin-Senour Company, Chicago, Ill., a corporation of Ohio Application August 14, 1953, Serial No. 374,392

1 Claim. (Cl. 137—635)

This invention relates to a dispensing valve for liquids, adapted to control liquid flow both therethrough and therefrom, instantaneously, in metered quantity and without leakage.

More particularly, this invention relates to a normally closed dispensing valve, means associated therewith to condition the valve to be opened and closed selectively, the valve adapted to dispense liquids, when conditioned, and opening and closing of conditioned valves effected by impact means.

In the preferred form of the invention as illustrated in the accompanying drawings, multiple unit valves are assembled together in a multiple valve block wherein each unit valve may be selectively conditioned to be opened and closed while other units are not conditioned and remain closed or in by-pass state. The novel feature of the assembly resides primarily in the fact that valves selectively conditioned to operate, or open and close, receive the energy essential to snap action from impact means.

The hammer operated valve of this invention is adapted to the problem of dispensing liquids, particularly those of a viscous nature and more particularly to dispensing and maintaining suspensions of finely divided solid colorants in liquid carriers, for example, paints. A specific application is in dispensing metered quantities of liquid colorants to produce protective and decorative coatings of hue, value and chroma as pre-selected from a prepared color gamut.

Heretofore considerable skill and ingenuity have gone into the problem of dispensing valves for control of paint-like liquid dispersions. In prior art manually controlled dispensing valves, human reflex action has been a limiting factor in accuracy of delivery, in the number of valves simultaneously operable and in control of after-drip from delivery ports.

It is the general object of this invention to provide an impact operated valve adapted to by-pass liquids when in a closed or normal position, to be conditioned by selective control means to open and to deliver fluids therefrom and to close to return liquids delivered thereto back through liquid supply means to provide sufficient agitation of the liquid supply to assure uniformity of said liquid.

It is a further object of this invention to provide impact actuated valves, the energy of the impact means opening and closing selected or conditioned ones of said valves.

It is another object of this invention to provide an impact operated valve, conditioned to open to deliver liquids therefrom by control means associated with said valve and to close to by-pass liquids delivered to said valve back through associated supply means.

It is a particular object of this invention to provide a multiple valve block containing a plurality of individual dispensing valves, each one of which may be conditioned to be operated individually or in any combination and those so conditioned to operated, operated simultaneously by timed impact means to open to deliver metered quantities of liquids therefrom and to be sharply closed by impact means to by-pass position immediately thereafter.

Other and further objects of the invention will appear as the description of the invention proceeds.

The invention is more fully shown in the accompanying drawings, in which:

Figure 6 is an enlarged vertical sectional elevation of a preferred embodiment of a multiple valve unit as shown in Figures 1 and 2 taken along the line 6—6 of Figure 7 with parts broken away and other parts removed.

Figure 7 is an enlarged plan view of the multiple valve unit of Figure 6 with parts broken away and other parts removed for purposes of clarity.

Figure 8 is an enlarged fragmentary front elevation showing the ancillary control means which regulate conditioning of individual valve units corresponding to Figure 9.

Figure 9 is an enlarged fragmentary side elevation of a section taken along the line 9—9 of Figure 1 with parts removed.

Figure 3:
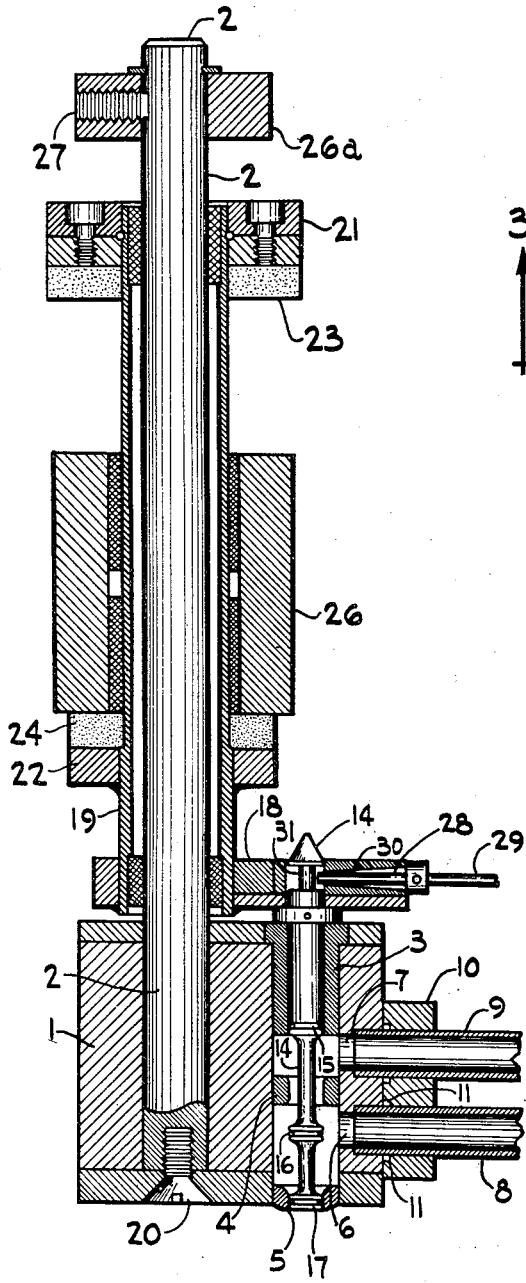
Figure 3 is an enlarged vertical sectional elevation of a single valve unit taken along the line 3—3 of Figure 4 with parts broken away and other parts removed for purposes of clarity.
Figure 4:
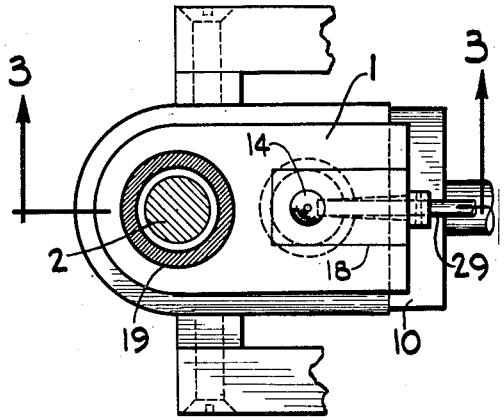
Figure 4 is an enlarged plan view of a single valve unit with parts broken away and partially in section corresponding generally to Figure 5.
Figure 5:
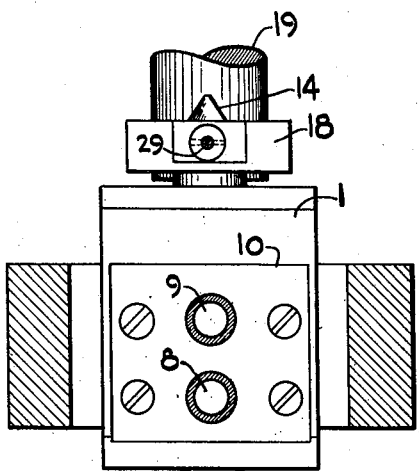
Figure 5 is a rear elevation of a single valve unit with parts removed and broken away.

Initially referring to Figures 3, 4 and 5, valve block 1 is drilled vertically to house hammer shaft 2 and valve guide bushings 3, 4 and 5. Block 1 is further drilled horizontally to provide inlet port 6 and outlet port 7 which accommodate corresponding conduits 8 and 9 seated therein, held in position by face plate 10 sealing through rubber rings 11 about each conduit entering the valve block. The unit valve 14 is fitted within the bushings 3, 4 and 5 and provided with rubber "O" rings 15, 16 and 17 to insure against leakage. Valve lift plate 18 is welded to tubular member 19 adapted to slide upward and downward on vertical shaft 2 secured in block 1 by a screw 20. Anvil plates 21 and 22 are heavy washerlike members secured to tubular member 19. Interiorly of each of the anvil plates and facing one another are leather washers 23 and 24 adapted to absorb the shock when hammer-head 26, made of rectangular bar stock centrally drilled to slide freely over the exterior of tubular element 18, is fired and driven against either of the anvil plates 21 and 22. Collar 26-a keyed to shaft 2 by set-screw 27 holds the valve operating mechanism within required limits of motion. Valve lift plate 18 is drilled horizontally to provide guide 28 for saxophone control rod 29 tip 30 to move inwardly sufficiently to engage notch 31 of valve 14 when valve 14 is conditioned to be operated. Normally, valve 14 is in closed position to allow by-pass of liquid delivered thereto as illustrated, wherein rod tip 30 is withdrawn momentarily from contact with notch 31 of valve 14 against tension of springs 55. In closed position, liquids delivered from a supply source through conduit 8 and port 6 are by-passed by closed valve 14 to return to the supply source through port 7 and conduit 9.

In a preferred embodiment of the invention shown in Figures 6 and 7, multiple valve units 35 are arranged equidistantly from central shaft 36 and valve lift plate 18 is adapted to slide over the plurality of unit valves 35 as in the simple embodiment illustrated in Figures 3, 4 and 5. Arrangement of the passageways to and from each unit valve in the multiple unit design as illustrated in Figures 6 and 7 show engagement of a plurality of saxophone rods 40 tips 41 through guides 42 of valve plate 18 and valve 35 notches 37. Structural details of the activating hammer and unit valves are identical to those illustrated in connection with Figure 3 and are similarly numbered, with exceptions as noted.

Conditioning of one or more unit valves may be correlated to one or more liquid metering devices, as in the preferred embodiment of the invention shown in Figures 1, 2, 6, 7, 8 and 9. While other means for conditioning, depending upon the apparatus and purpose intended, are within the purview of those skilled in mechanical arts, we illustrate a conditioning means associated with our metering pump described in copending application U. S. Serial Number 374,394, now Patent No. 2,796,195, and dispensing machine described in copending application U. S. Serial Number 374,302, now Patent No. 2,796,194, filed of even date herewith and incorporated herein by reference.

Figure 1:
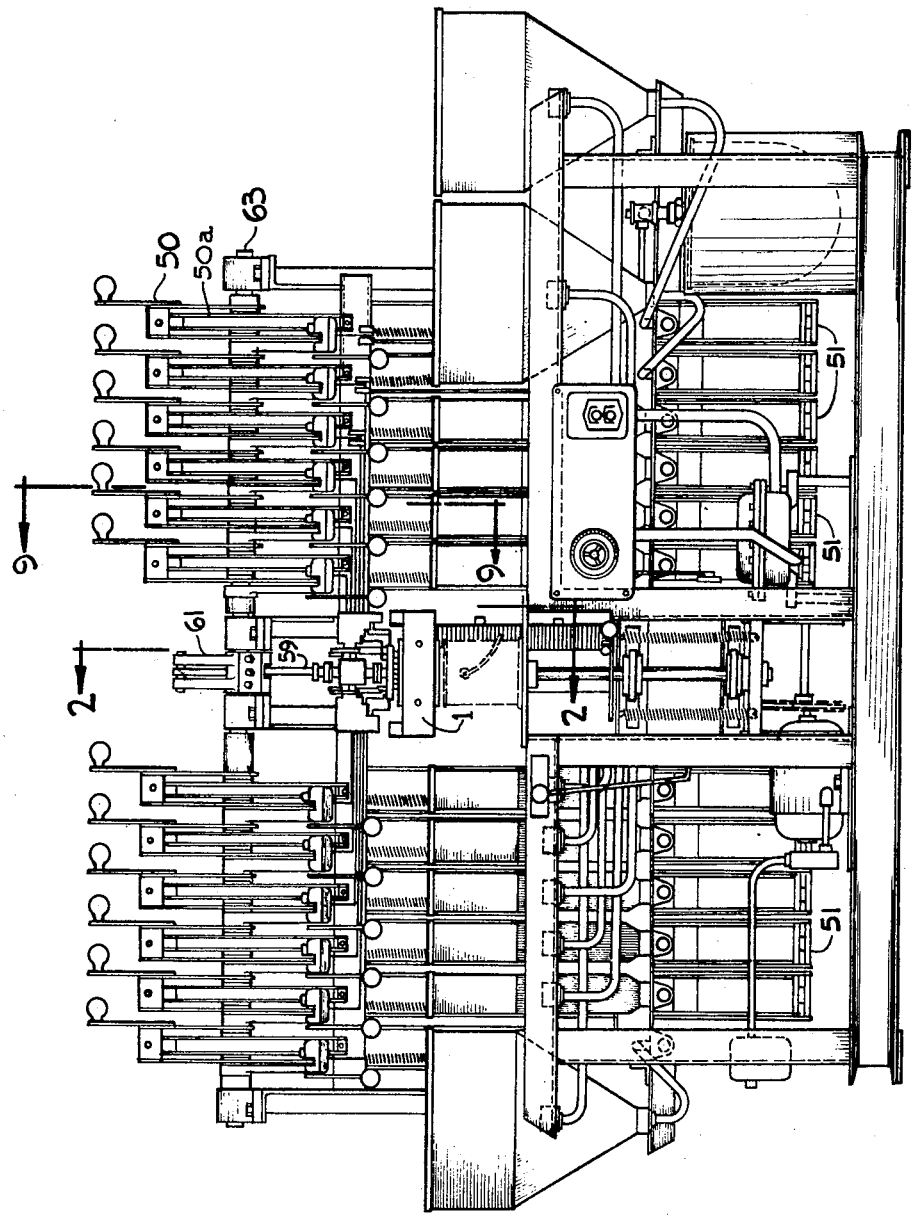
Figure 1 is a front elevation of a completely assembled dispensing machine including centrally thereof as an essential element, a preferred embodiment of our invention.

Describing our control means for a metering pump by referring initially to Figures 8 and 9, the extent of angular rotation imparted by calibrated dial wheel 50 to walking beam 50a controls displacement of pump 51 associated therewith as shown in Figure 1. If calibrated dial 50 is set to impart more than 120 degrees of arc to walking beam 50a, pin 52 set in one face of dial 50 contacts vertical finger 53 of saxophone control rods 54 momentarily withdrawing rod tips 30 or 41 from contact with notch 31 or 37 of unit valve 14 or 35 against the tension of saxophone rod springs 55 (Figure 2) through the resultant torque upon the saxophone rods 54. However, if calibrated dial 50 is set to impart less than 120 degrees of arc to rocking beam 50a pin 52 does not move vertical finger 53 and tension of springs 55 causes constant engagement of rod tips 28 or 41 in valve plate 18 and guides 28 or 42, thus conditioning the valves so engaged to be moved with movement of anvil plates 21 and 22 when driven by impact of hammer 26.

Valve units so conditioned to operate are opened and closed by impact of hammer-head 26 against anvil plates 21 and 22 respectively. Operation of the hammer is best explained by reference to Figure 2. A main timing and driving gear 58 provides power for operation of metering pumps 51 associated with unit valves forming the subject matter of this invention. Timing of the impact means which operate conditioned valves also originates with gear 58. Rotation of gear 58 in the direction shown moves crank pin 60 around a circular path. Crank pin 60 drives arm pin 62 through connecting rod 59 to provide oscillatory motion to main crank 61 and main shaft 63 indirectly operating metering pumps 51 associated therewith.

Figure 10:
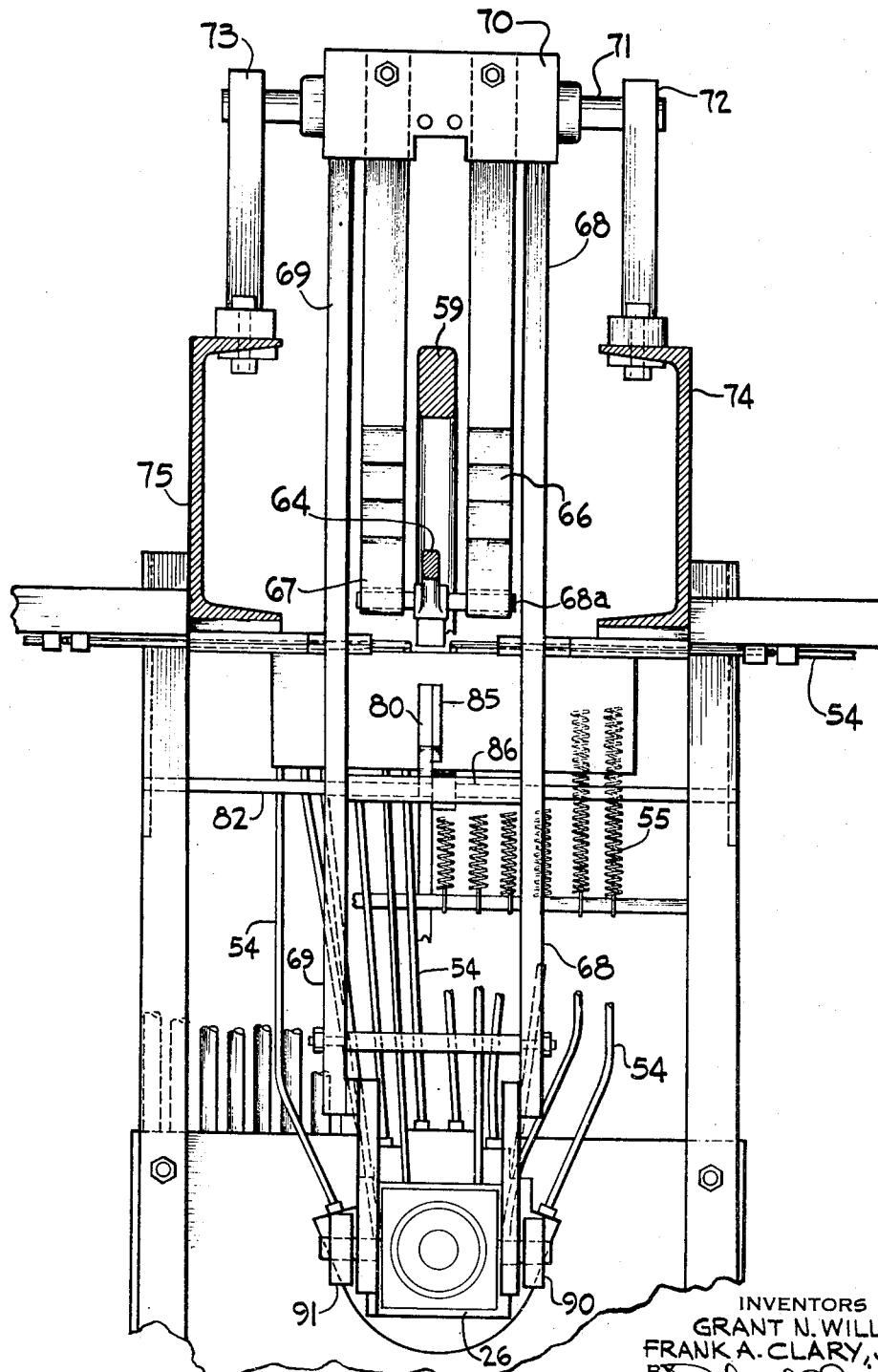
Figure 10 is a plan view of a horizontal section along the line 10—10 of Figure 2 with parts broken away and other parts removed.

Movement of main crank arm 61 moves bell crank 67 pivotally attached to crank 61 at 65 by pin 68 and to leaf springs 66 and 67 by pin 68a. Oscillatory motion of crank 61 thereby flexes the springs in a downward direction at the extreme of its arc of oscillation and in an upward direction at the other extreme. The other end of spring element 66 and 67 (Figure 10) is clamped by plate 70 to the arms 68 and 69 of a bifurcated hammer-operating lever pivoted in shaft 71 carried by brackets 72 and 73 attached to main vertical frame members 74 and 75.

Figure 2:
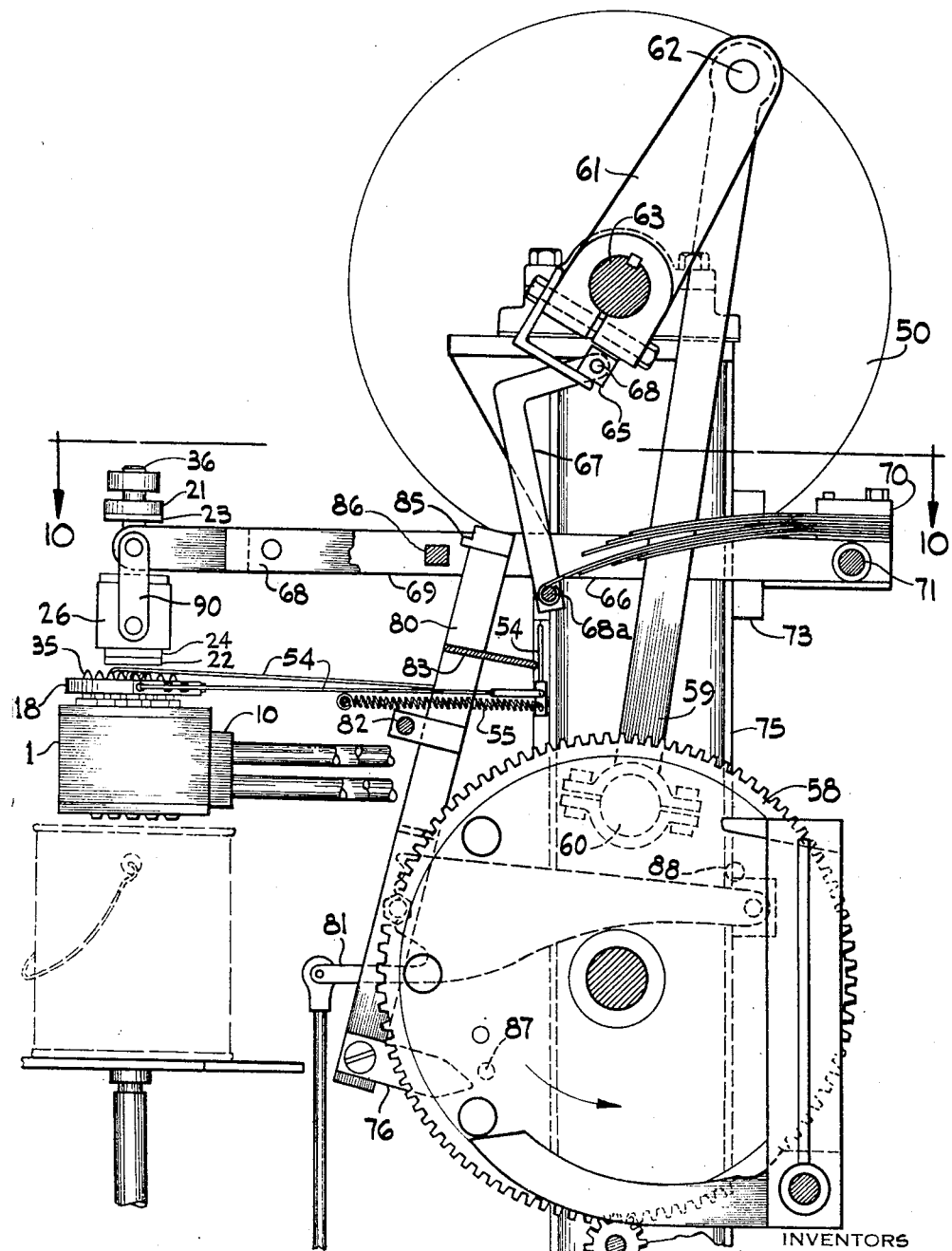
Figure 2 is an enlarged fragmentary vertical sectional elevation along the line 2—2 of Figure 1 with parts removed and other parts broken away for purposes of clarity.

In the position shown in Figure 2, trigger arm 80 is locked out of contact with all elements of timing gear 58 by cam control lever 81, not essential to the present invention. In this position, trigger arm 80, pivoting about supporting shaft 82 forces block 83 against the downwardly bent ends of saxophone rods 54 (Figures 2 and 8) disengaging all valve units from valve lifting plate 18 as all rod tips 30 or 41 are momentarily withdrawn from valves 14 and 35. However, if cam control lever 81 is either removed or properly positioned to operate, trigger arm 80 pivots about shaft 82, and detent 85 engages the top of rectangular rod or stop 86 spanning between arms 68 and 69 of the bifurcated hammer operating lever.

As crank arm 61 is lowered, bell crank 64 is raised, loading hammer operating arms 68 and 69 to be driven upwards by energy stored in spring elements 66 and 67. At a timed interval, pin 88 in one face of gear 58 strikes trigger 80 finger 76 releasing detent 85 of trigger arm 80 from atop stop rod 86 allowing hammer handles 68 and 69 to drive hammer 26 upward through links 90 and 91 striking anvil plate 21 lifting valve plate 18 and all valve units conditioned to be opened are opened as a result of the impact.

The action is reversed as bell crank 64 is forced downward, stop rod 86 engages the upper side of detent 85 and hammer operating arms 68 and 69 are spring loaded downward. Again, at the proper time determined by gear 58, pin 87 trips trigger-finger 76 and trigger arm 80, firing hammer 26 downward, driving all conditioned valves 14 and 35 closed, instantaneously. The force of closure prevents dripping from orifice bushings 5 and terminates flow of metered liquids from said orifices. Immediately upon closure, the valves are in by-pass position and fluids directed to the unit valves are by-passed to the supply means. As can be observed from the above description and drawings, each individual valve may be conditioned to operate or not to operate upon impact of the hammer against the mechanism operating the valve plate. Hence it follows that one unit or a plurality of units may be assembled to be operated by impact means as described.

A single unit and a multiple unit embodiment of the invention have been shown and described operated by a spring-loaded hammer as illustrative of a preferred embodiment. Modifications within the spirit and scope of the appended claims are contemplated.

What we claim is:

A multiple valve unit dispensing head adapted to circulate therethrough and meter therefrom quantities of liquids of varying quality which comprises a plurality of vertically aligned fluid receiving chambers within said head, a dispensing port in the base of each of said chambers and a pair of ports providing ingress to and egress from each of said chambers, valve means interiorly of each of said chambers adapted to control fluid flow through said ports, means associated with each of said valves to condition said valve means to be acted upon by impact means to open and closed positions; when closed to by-pass and circulate fluids through said ingress and egress ports and when open to dispense fluids from said ingress port through said dispensing port, impact means to activate conditioned ones of said valves, and means to select certain ones of said valves to be so conditioned.

References Cited in the file of this patent

UNITED STATES PATENTS

| 1,076,647 | Welman | Oct. 21, 1913 |
|---|---|---|
| 1,806,925 | Trapper | May 26, 1931 |
| 1,924,868 | Loveker | Aug. 29, 1933 |
| 2,041,416 | Johnson | May 19, 1936 |
| 2,194,877 | Steiger | Mar. 26, 1940 |
| 2,207,599 | Schoettinger | July 9, 1940 |
| 2,300,112 | Ellingwood | Oct. 27, 1942 |
| 2,409,517 | Schmit | Oct. 15, 1946 |
| 2,536,506 | Kleber | Jan. 2, 1951 |
| 2,543,241 | Johnson | Feb. 27, 1951 |
| 2,638,108 | Williams | May 12, 1953 |
| 2,653,627 | Kelly | Sept. 29, 1953 |